Feb. 19, 1952      G. H. NORQUIST      2,585,961
METHOD OF MAKING METAL CLAD COUNTER TOPS
Filed Feb. 10, 1947      10 Sheets-Sheet 1
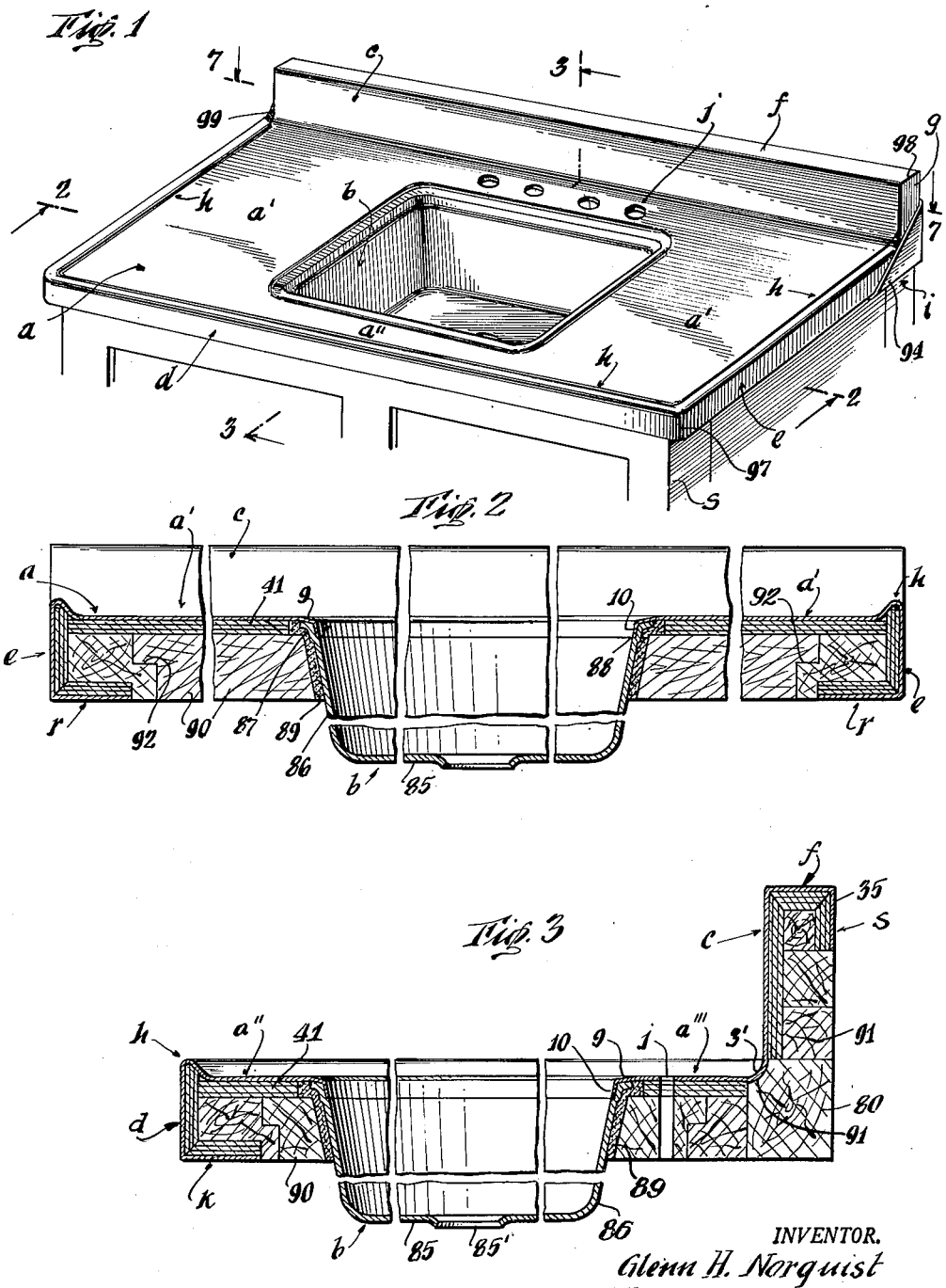
INVENTOR.
Glenn H. Norquist
BY
Austin Wilhelm Carlson
ATTORNEYS Feb. 19, 1952 G. H. NORQUIST 2,585,961
METHOD OF MAKING METAL CLAD COUNTER TOPS
Filed Feb. 10, 1947 10 Sheets-Sheet 2
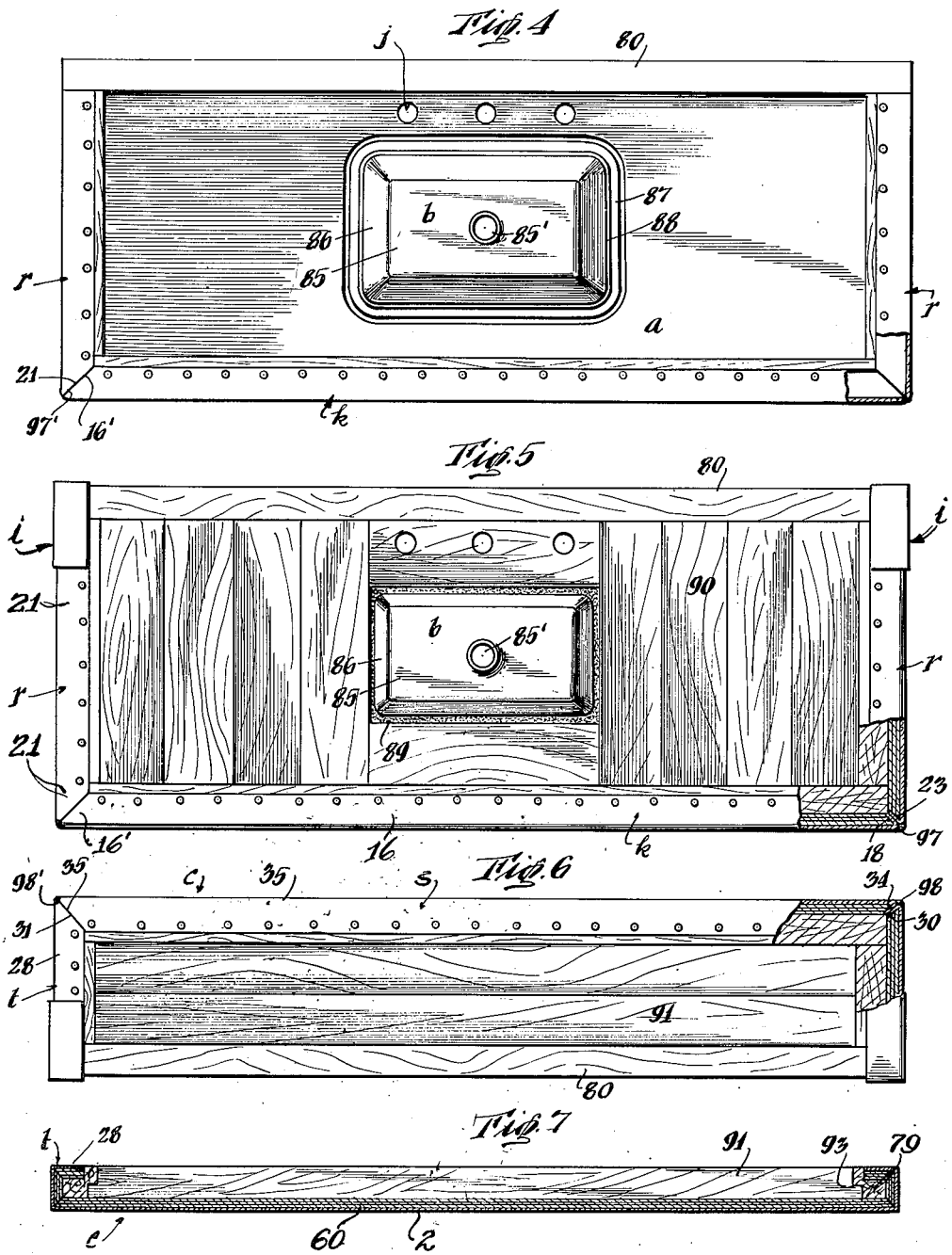
INVENTOR.
Glenn H. Norquist
BY
Austin Wilhelm & Carlson
ATTORNEYS Feb. 19, 1952   G. H. NORQUIST   2,585,961
METHOD OF MAKING METAL CLAD COUNTER TOPS
Filed Feb. 10, 1947   10 Sheets-Sheet 3
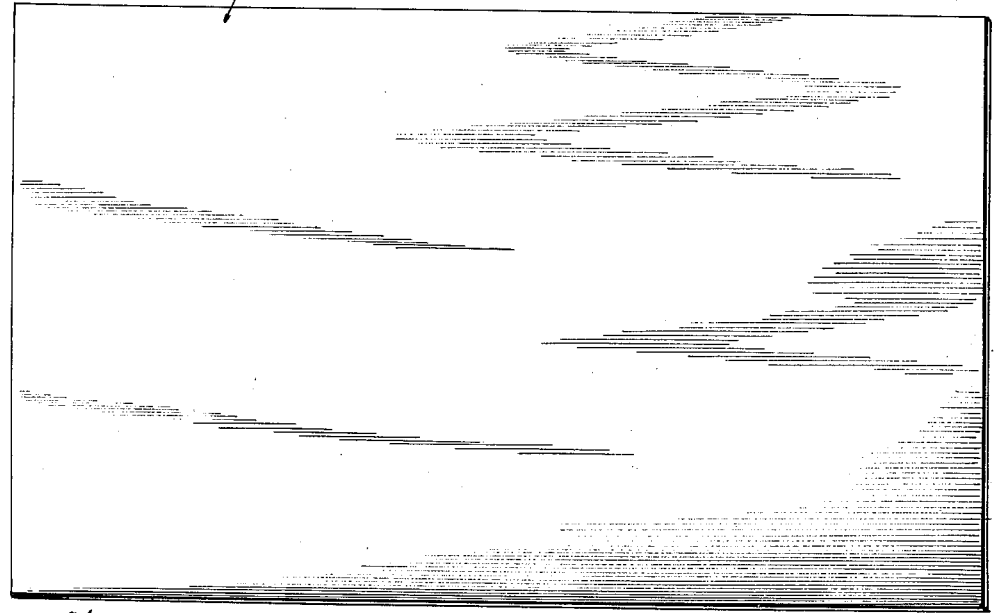
Fig. 8
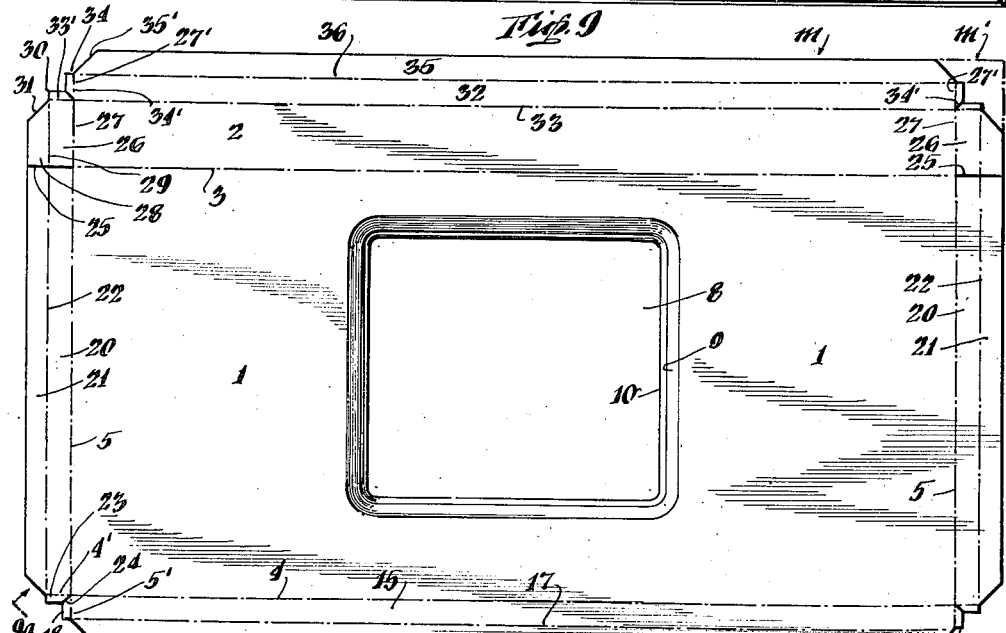
Fig. 9
Fig. 9a
INVENTOR
Glenn H. Norquist
BY
Austin Wilhelm & Carlson
ATTORNEYS Feb. 19, 1952 G. H. NORQUIST 2,585,961
METHOD OF MAKING METAL CLAD COUNTER TOPS
Filed Feb. 10, 1947 10 Sheets-Sheet 4
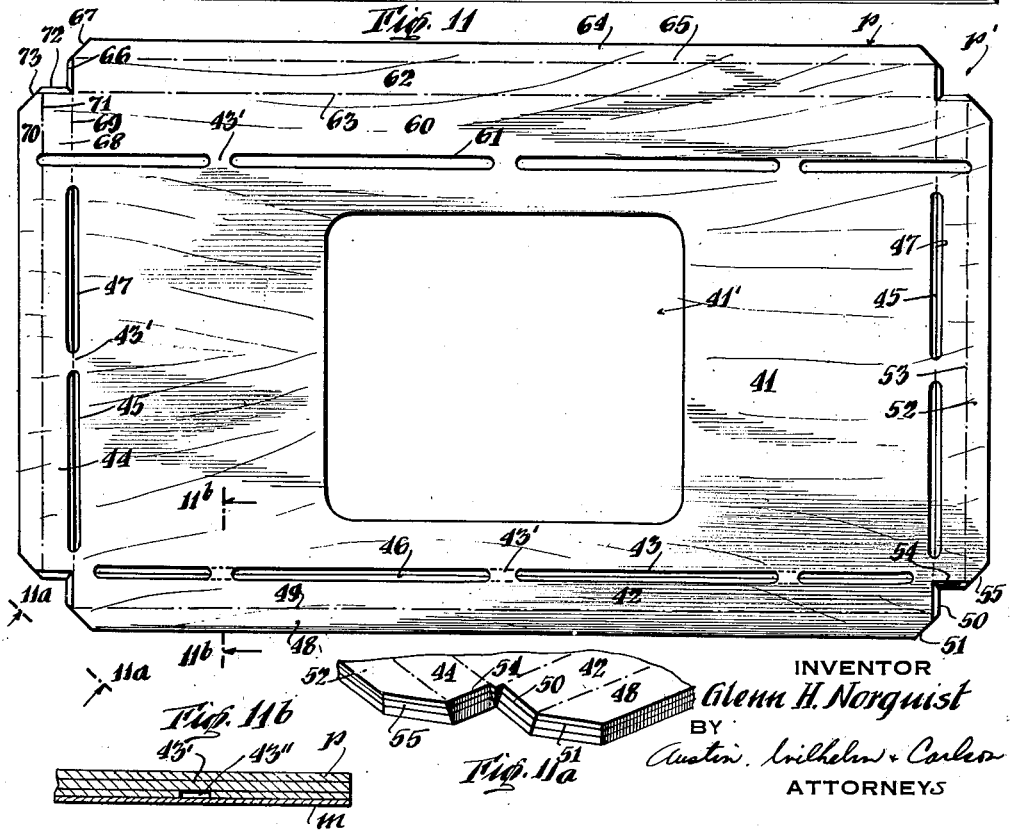
INVENTOR
Glenn H. Norquist
BY
Austin, Wilhelm & Carlson
ATTORNEYS Feb. 19, 1952 G. H. NORQUIST 2,585,961
METHOD OF MAKING METAL CLAD COUNTER TOPS
Filed Feb. 10, 1947 10 Sheets-Sheet 5
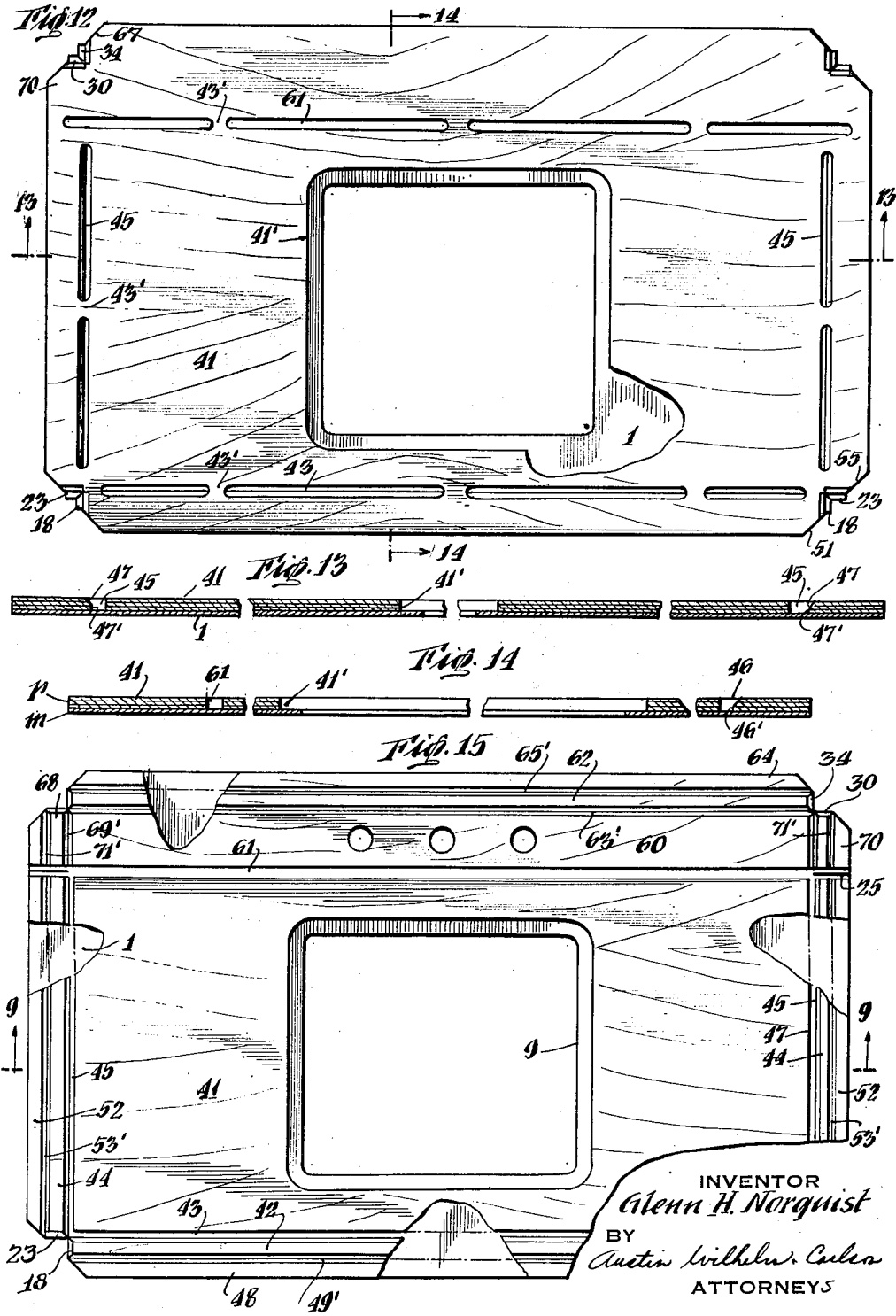

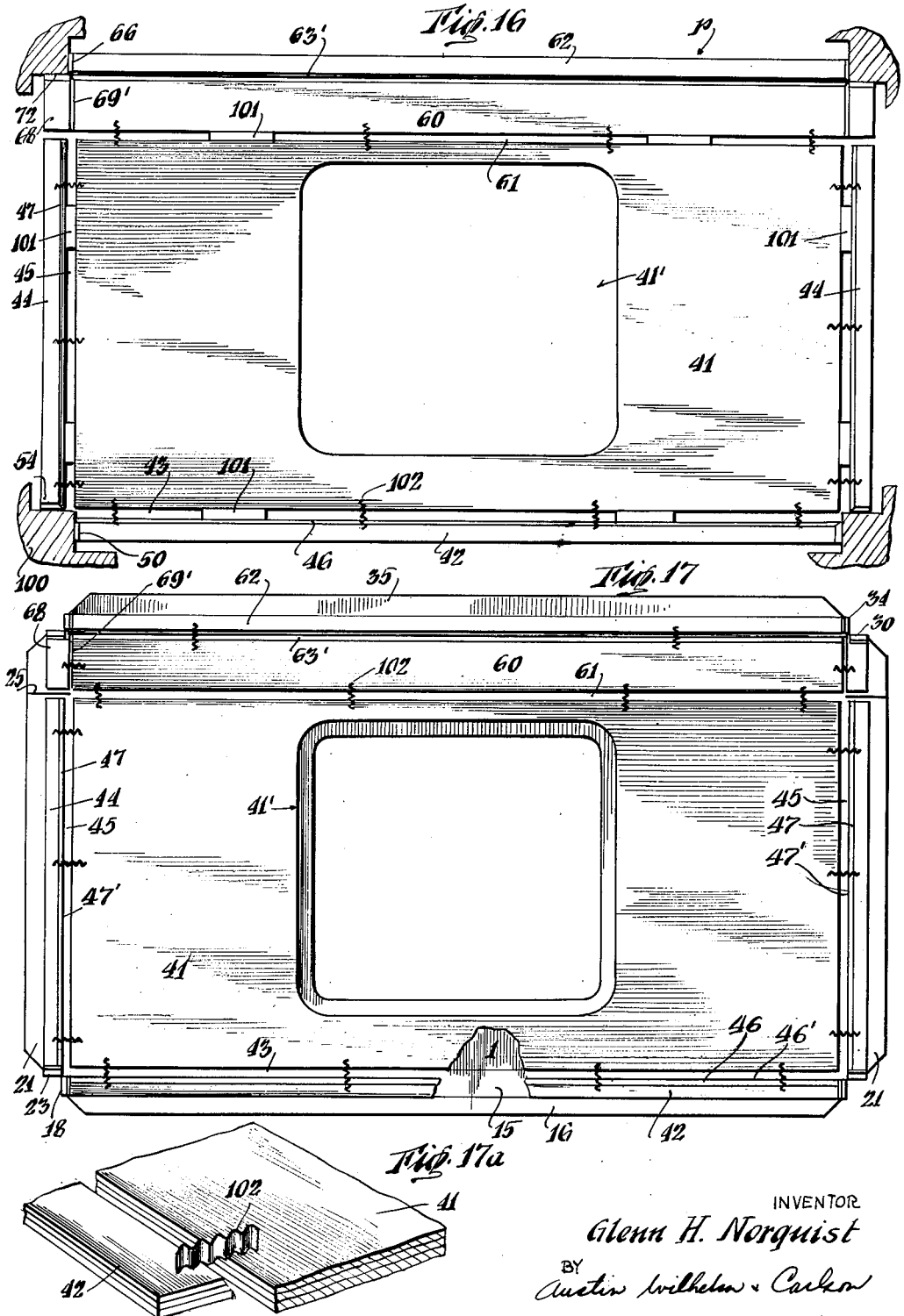

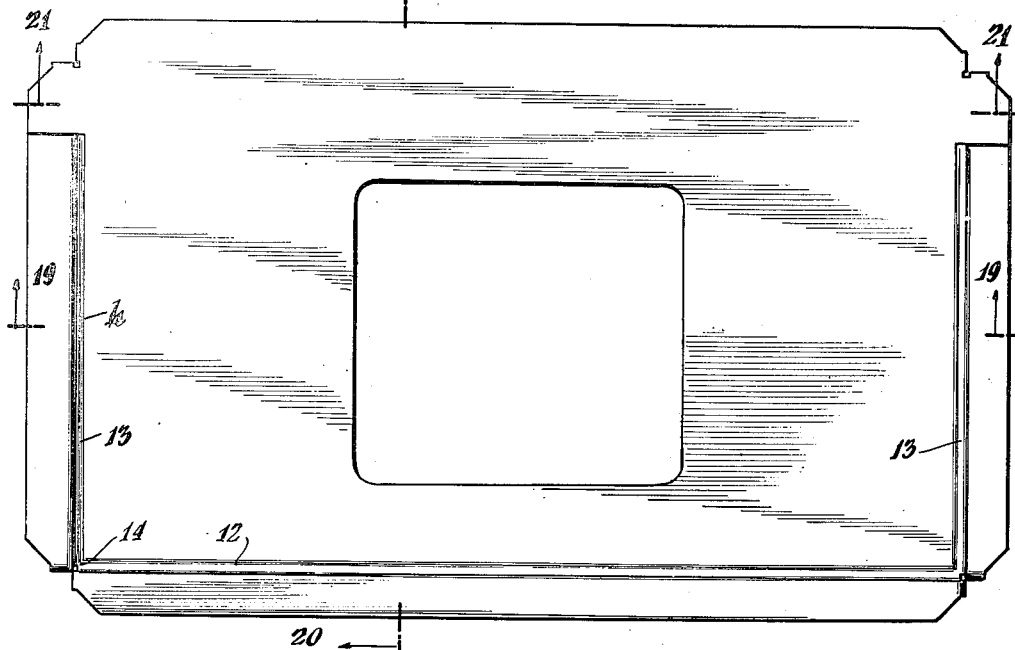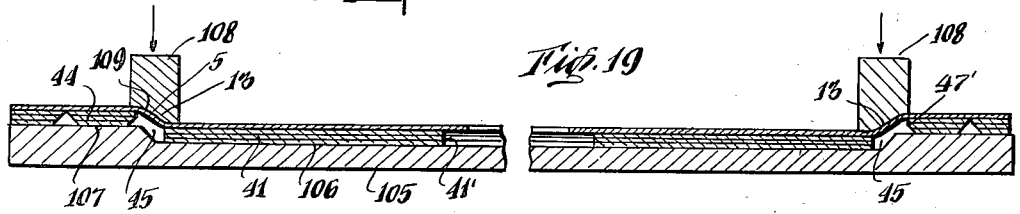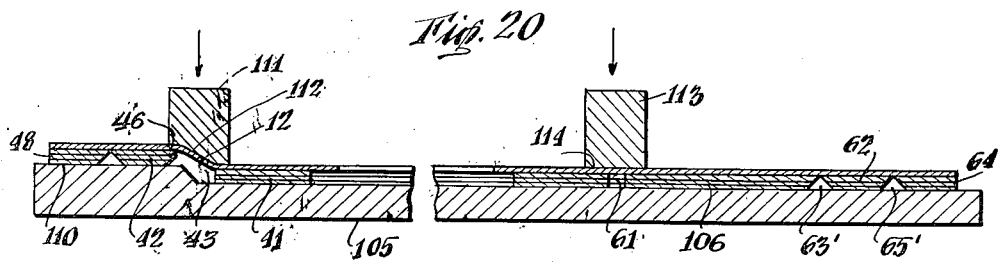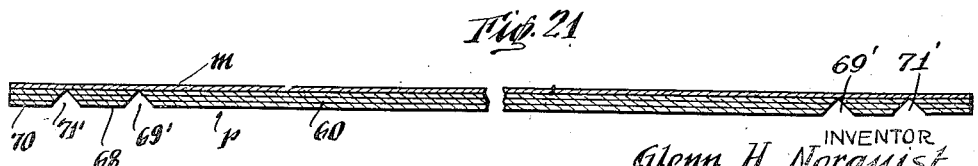

Feb. 19, 1952        G. H. NORQUIST        2,585,961
METHOD OF MAKING METAL CLAD COUNTER TOPS
Filed Feb. 10, 1947        10 Sheets-Sheet 8
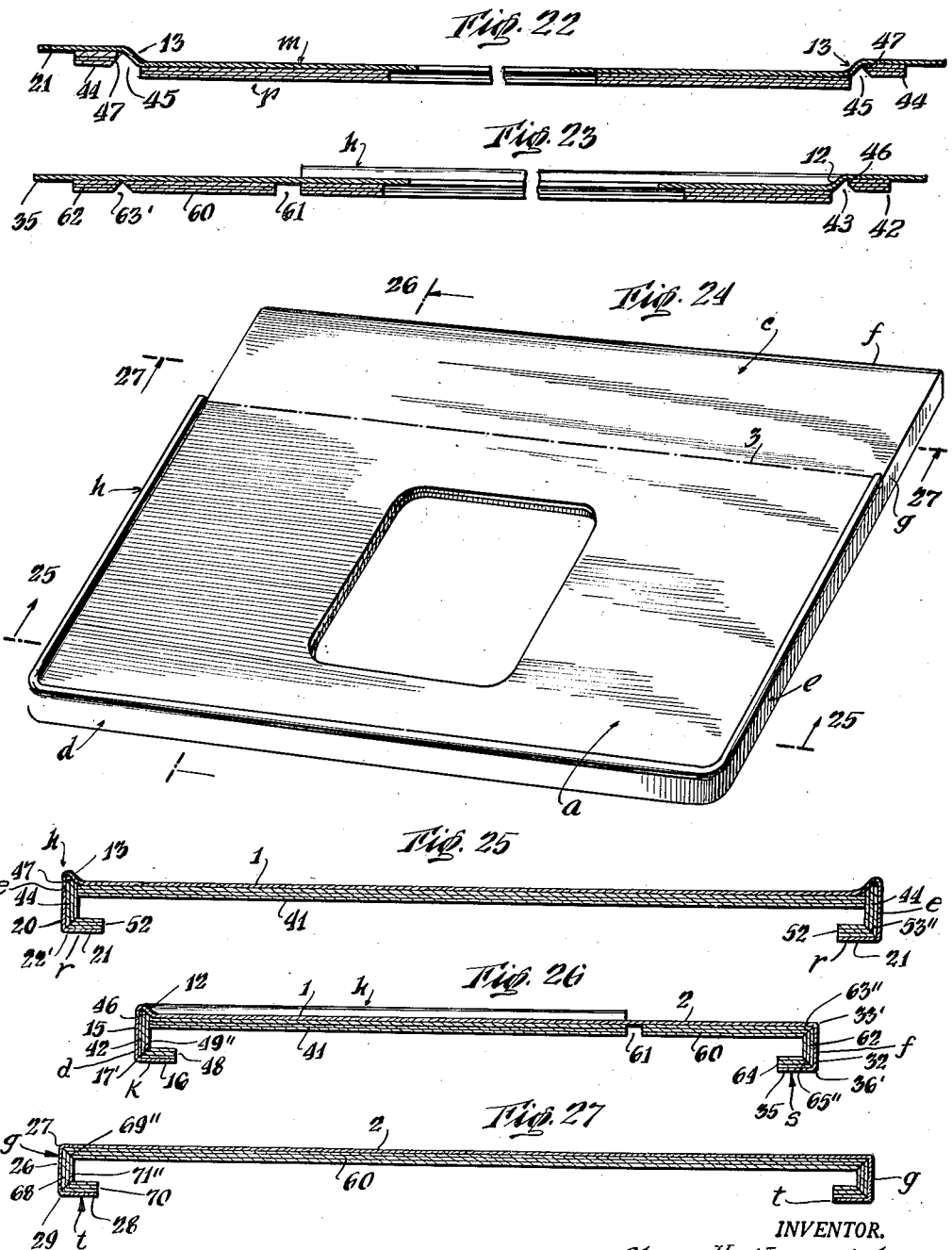
INVENTOR.
Glenn H. Norquist
BY
ATTORNEYS

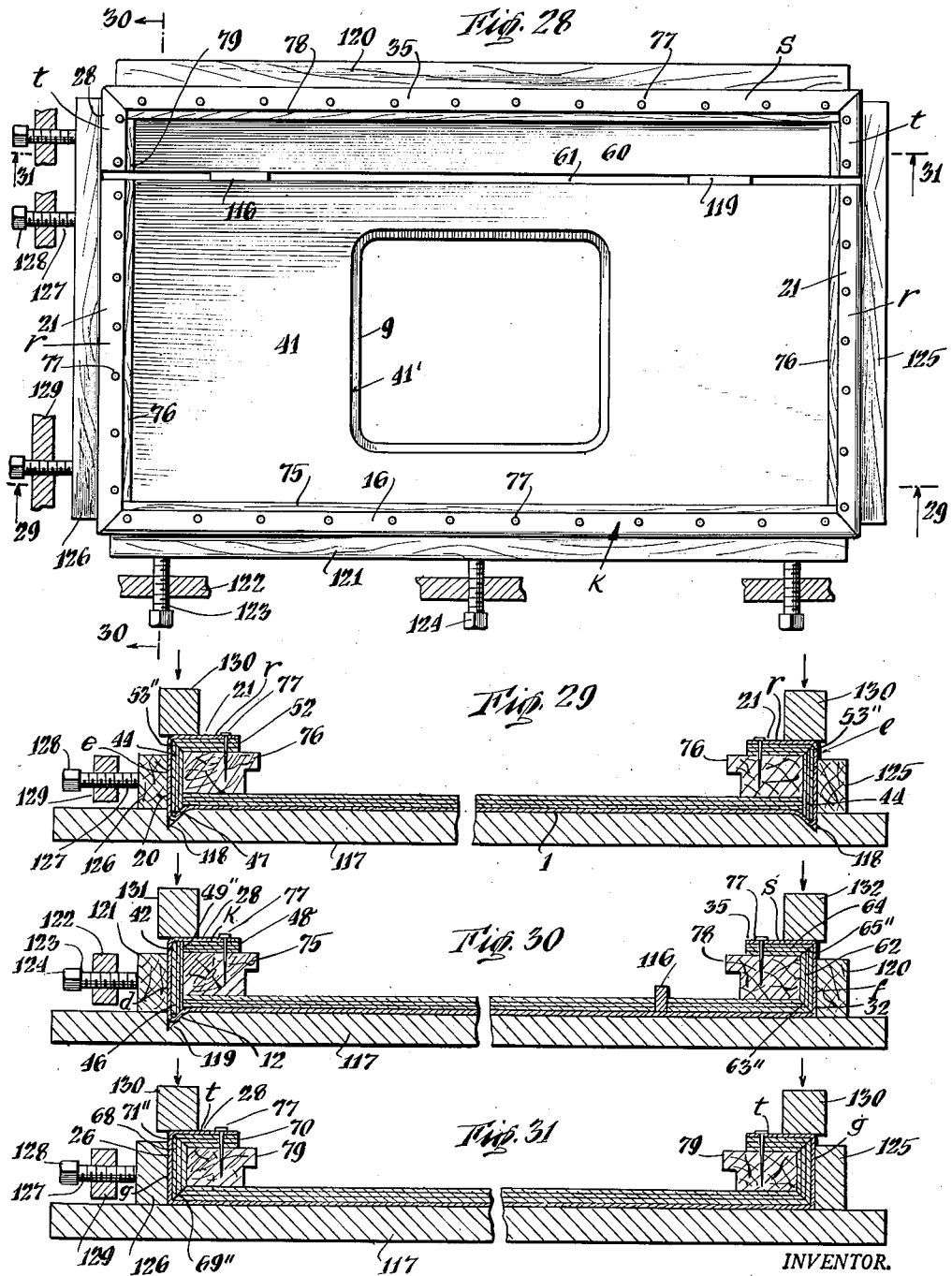

Feb. 19, 1952  G. H. NORQUIST  2,585,961
METHOD OF MAKING METAL CLAD COUNTER TOPS
Filed Feb. 10, 1947  10 Sheets-Sheet 10
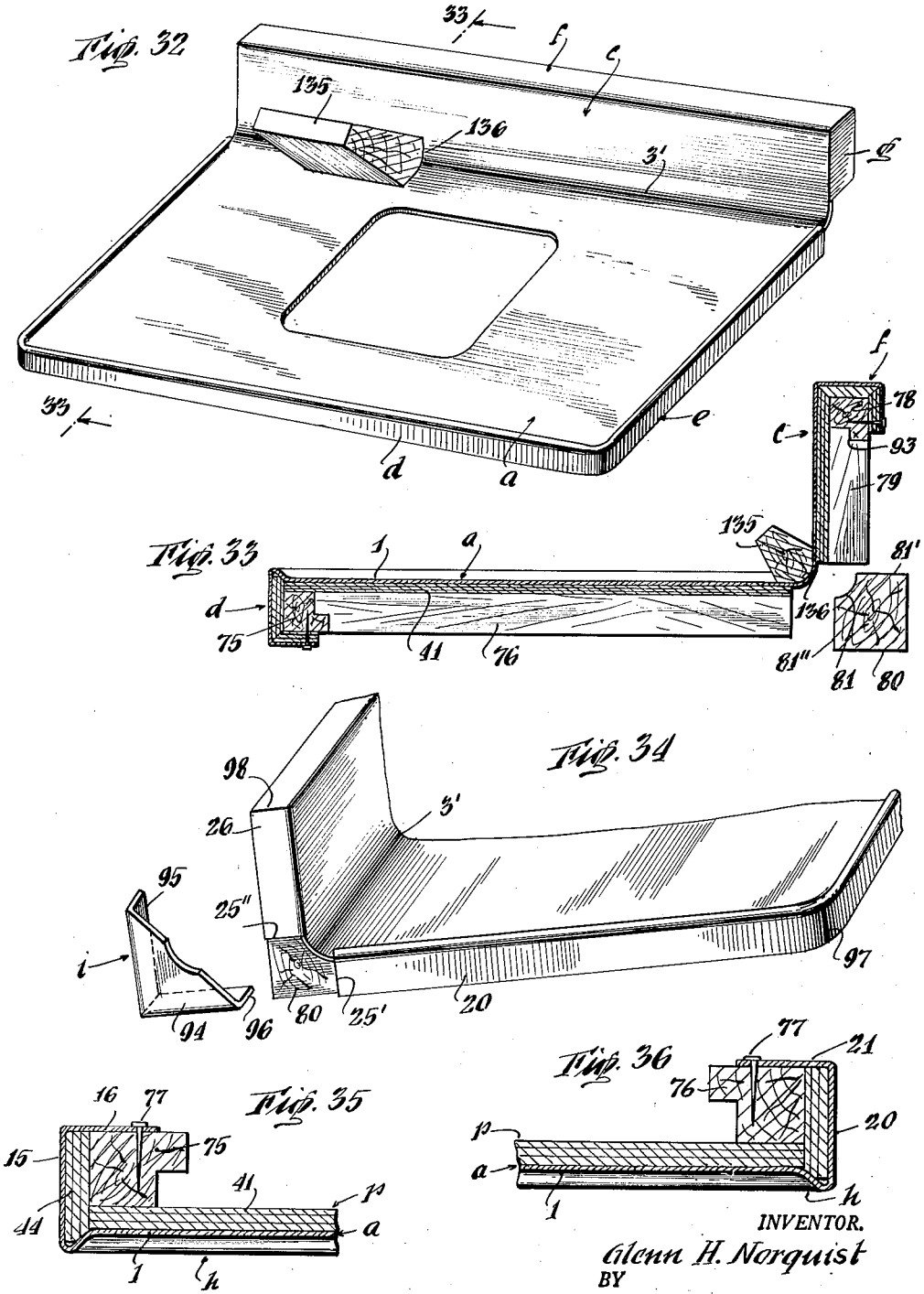
INVENTOR.
Glenn H. Norquist
BY
Austin Wilhelm & Carlson
ATTORNEYS Patented Feb. 19, 1952

2,585,961

UNITED STATES PATENT OFFICE 2,585,961

METHOD OF MAKING METAL-CLAD COUNTER TOPS

Glenn H. Norquist, Jamestown, N. Y.

Application February 10, 1947, Serial No. 727,585

4 Claims. (Cl. 29—148)

This invention relates to an improved method of making metal clad counter tops at economical cost.

Metal clad counter tops of the type herein illustrated as finished articles of manufacture, are disclosed and claimed in my copending applications Ser. No. 727,582, filed February 10, 1947 (now Patent No. 2,539,462), and Ser. No. 727,583, filed February 10, 1947 (now Patent No. 2,539,463). These metal clad counter tops may be formed from a single sheet of light gauge metal stiffened and supported by fibrous backing sections to present a table section having a splash section rising from one edge thereof. The table section may be provided with one or more sink wells bonded to the metal facing sheet thereof whereby the construction provides a table sink of lasting utility and pleasing appearance. The perimeter of the table section is desirably provided with a raised rim formation whereby the top surface of the table section presents drain board areas surrounding the sink well.

The metal facing sheet is formed so as to cover the exposed faces of both the table portion and the splash portion to provide a construction free from visible seams, all metal facing surfaces being backed up and supported by fibrous backing sections so that the metal facing surfaces cannot readily be dented or deformed. The metal facing sheet selected is preferably formed from a bright metal, such as stainless steel, Monel metal, aluminum, brass or copper, which may be polished and finished on the top side prior to cutting, shaping and bending thereof.

After the metal facing sheet has been polished, the sink well opening is cut therein and the corners thereof cut to the proper contour. A fibrous backing panel is adhesively bonded to the rear unfinished face of the metal facing sheet. The fibrous backing panel may be formed from laminated plywood, hard pressed fiber board, composition board, or like fibrous sheeting commonly used in the building industry. The fibrous backing panel comprises a table backing section, front and side apron backing sections and splash backing sections shaped to closely conform to the corresponding sections of the metal facing sheet.

The apron backing sections, as bonded to the metal facing sheet, are spaced from the adjacent edges of the table backing section by an open groove of predetermined width. The elongated edge of each apron backing section next adjacent the table backing section, is also beveled or sloped with respect to the metal attaching face thereof. The backing panel as bonded to the metal facing sheet, thus presents the apron backing sections thereof in spaced relation to the table backing section in a manner to permit the formation of the raised rim which is to extend around the front and side edges of the table section of the metal sheet when the counter top construction has been formed.

The splash backing section, as bonded to the metal facing sheet, presents a longitudinal edge spaced from the adjacent rear edge of the table backing section by an open groove of a predetermined width to permit curvilinear shaping of the splash section of the metal facing sheet. The splash backing section, as secured to the metal facing sheet, is also provided with a longitudinally extending V groove to define a shelf backing section which provides support for the top shelf section of the metal facing sheet. Transversely extending V grooves are cut in the splash backing section to provide end backing sections for the end splash sections of the metal facing sheet. The shelf section and end sections of the metal facing sheet are also provided with inturned flange sections which may be covered by fibrous backing sections defined by V grooves cut in the backing panel. The metal apron sections are also preferably provided with inturned flange sections which may be covered by backing sections defined by V grooves cut in the backing panel.

As one method of manufacture of the backing panel, the table backing section, each of the apron backing sections and the splash backing section may be formed to the required shape as individual backing elements, the backing elements then being connected together in the proper space relationship by means of removable fasteners, so that the composite backing panel thus formed may be adhesively bonded as a composite unit to the metal facing sheet. The V grooves in the splash backing section which define the shelf backing section and the end backing sections of the splash panel may be cut into the splash backing element either before or after this element has been secured to the splash panel portion of the metal facing sheet. In event the inturned flanges of the splash panel portion of the metal facing sheet are also to be covered by fibrous backing, the splash backing element is made of sufficient size to also cover these metal flanges, V grooves being cut in the splash backing element either before or after the splash backing element has been adhesively bonded to the metal facing sheet to permit bending formation of these sections. If the inturned metal flanges associated with the apron sections of the metal sheet are also to be provided wiht fibrous backing, the individual apron backing elements are made of sufficient size to cover the associated flange sections of the metal sheet, the flange backing sections being defined by V grooves cut in the apron backing element either before or after the individual apron backing elements are adhesively bonded to the corresponding areas of the metal facing sheet.

As a modified method of manufacture, a one piece backing panel may be provided which is initially substantially rectangular in form, and from which the sink well opening is cut out and the corners of the panel trimmed off and sloped to the proper contour. Open grooves are cut in the unitary panel to define the adjacent edge contours of the table backing section and the adjacent apron backing sections and splash backing section. Connecting neck portions extending between the apron backing sections, the splash backing section and the table backing section are left uncut, so that the entire backing panel will hang together as a unit when adhesively bonded to the rear face of the metal facing sheet. When the backing panel has become firmly bonded to the metal sheet, the connecting necks are cut out so that the apron backing sections, the splash section and the table backing section are separated from each other. The V grooves may then be cut in the metal faced backing panel to define the shelf backing section and the end backing sections of the splash panel.

Irrespective of which method is followed in initially shaping the backing sections, the table backing section, apron backing sections and splash backing section are adhesively bonded to the rear face of the prepared metal sheet in the proper spaced relationship for the counter top to be formed.

The metal clad panel with the backing sections properly formed, is placed in a die press and the front and side edge portions of the table section of the metal sheet, unsupported by fibrous backing, are formed into a raised rim extending around the front and side edges of the table section of the metal facing sheet. The open grooves or channels defined between the adjacent edges of the table backing section and the apron backing sections and the splash backing section are so spaced and arranged as to permit shaping of the metal clad panel to provide depending apron sections and an erected splash section. A bonding adhesive may be applied to the open grooves and V grooves of the metal bonded backing panel prior to bending formation of the metal clad panel.

The metal clad panel may be initially shaped in a clamping frame which serves to bend the apron sections into position substantially at right angles to the table section, and additionally operates to bend the top shelf section and the end sections of the splash portion into position substantially at right angles to the main splash section. In this forming operation, the longitudinally extending beveled edges of the apron sections will fold over into the adjacent open grooves and will be brought into abutment against the rear face of the adjacent raised rim formations of the metal sheet to provide a firm backing support therefor. The shelf section and end sections of the splash portion are bent along the adjacent V grooves formed in the backing panel so as to extend substantially at right angles to the main splash section. While the apron sections of the table portion, and the shelf section and end sections of the splash portion, are still retained in fixed position by the clamping frame, the flange sections of the metal sheet associated therewith are turned inwardly and stiffening strips inserted to fit snugly under the inturned flange sections. The stiffening strips are assembled to provide a stiffening frame extending around the inside face of the apron backing sections, and a second stiffening frame extending around the inside face of the shelf backing section and end backing sections of the splash portion. The inturned flange sections associated with the apron sections may be secured to the adjacent stiffening frame as by nails or screws, and the inturned flange sections associated with the splash portion may likewise be secured to the adjacent stiffening frame as by nails or screws.

The thus partially assembled counter top, having the splash section and table section lying in substantially the same plane, is then removed from the clamping frame, and the bonding adhesive previously applied in the open channel grooves and V grooves of the backing panel is permitted to harden and set. The splash section is then erected around an elongated mandrel having a rounded edge which gives the metal sheet a rounded curvature between the table section and the main splash section. A wood stiffening bar is then fitted against the rear uncovered face of the curved portion of the metal sheet located at the base of the erected splash portion. The stiffening bar is so shaped that the adjacent ends of the side stiffening strips underlying the table section, and the adjacent ends of the side stiffening strips underlying the main splash section, will abut against the stiffening bar in position to be secured thereto. As thus constructed the splash section will be rigidly formed to extend substantially at right angles to the table section, both the table section and the splash section being also rigidly reinforced by the underlying stiffening frames.

The sink well, which may be formed from a single sheet of bright metal stamped to the desired well contour, is then placed in position and the upper edge thereof bonded to the peripheral edge which defines the sink well opening in the table section of the metal facing sheet. Fibrous filler boards are then employed to fill the space within the stiffening frames previously applied to the table section and splash section, which filler boards further strengthen the construction.

The metal facing sheet is provided with lip portions extending from the adjacent ends of the apron sections thereof which are folded over the adjacent inclined ends of the apron backing sections while the metal clad panel is still in flat form. When the apron sections have been shaped to extend substantially at right angles to the table section, the adjacent lip portions of the metal sheet will be in face-to-face contact and extend diagonally inwardly from each of the front vertical corners of the table top section. The metal sheet is also provided with similar lip portions extending from the adjacent ends of the shelf section and end sections of the splash portion thereof, which lip portions are folded over the adjacent inclined ends of the adjacent backing sections while the metal clad panel is still in flat form. When the shelf section and end sections of the splash portion have been shaped to extend substantially at right angles to the main splash section thereof, these adjacent lip portions will also be in face-to-face contact and extend diagonally inwardly from each horizontal corner edge of the splash portion. A seam of soldering or welding metal is applied to the exterior surface of the vertical joints defined between the adjacent lip portions of the apron sections, and a similar seam of solder or welding metal is applied to the exterior surface of the horizontal joint defined between the adjacent lip portions of the splash section. The molten metal seeps inwardly between the adjacent lip portions to firmly bond the adjacent lip portions into integral union. The exterior surfaces of these metallic seams may be burnished or polished to give these four corner edges a rounded and finished appearance.

The fibrous backing sections bonded to the rear face of the metal facing sheet prevent wrinkling, warping or other undesired distortions of the metal sheet during shaping and bending thereof into counter top form, and in addition insure stiffness, strength and rigidity to the construction, provides a sound deadening effect so that the metal facing surfaces will not reverberate or produce a metallic ring when drummed upon, and in addition permit the use of a relatively light gauge facing sheet which can be worked and shaped with relative ease. The stiffening frames and filler boards applied to the table section and splash section, further enhance the rigidity and strength of the counter top without substantially increasing the weight of the construction. This improved counter top thus presents all the exposed surfaces thereof covered by an unbroken metallic layer which may be made of bright metal and thus can be easily cleaned and kept in a highly sanitary condition.

An object of this invention is to provide an improved method for the production of high quality metal clad counter tops having aproned table sections by high speed mass production operations, with a minimum of labor and a minimum use of material, and at low cost.

Other objects and advantages of this invention will become apparent as the disclosure proceeds.

Although the characteristic features of the invention will be particularly pointed out in the claims appended hereto, the invention itself, and the manner in which it may be carried out, may be better understood by referring to the following description taken in connection with the accompanying drawings forming a part thereof, in which Fig. 1 is a perspective view of the fully assembled counter top having a single sink well, constructed in accordance with this invention.

Fig. 2 is an enlarged longitudinal cross sectional view of the fully assembled counter top as the same would appear when viewed along line 2—2 of Fig. 1.

Fig. 3 is an enlarged transverse cross sectional view of the fully assembled counter top as the same would appear when viewed along line 3—3 of Fig. 1.

Fig. 4 is an underside view of the table section of the counter top prior to the application of the filler boards, this view illustrating the sink well as attached to the underside of the sheet metal facing which surfaces the table section.

Fig. 5 is an underside view of the fully assembled counter top, a corner section thereof being partially broken away to illustrate further structural details thereof.

Fig. 6 is a rear face view of the splash section of the fully assembled counter top, a corner section thereof being partially broken away to illustrate certain structural details thereof.

Fig. 7 is a longitudinal cross sectional view of the splash section of the fully assembled counter top as the same would appear when viewed along line 7—7 of Fig. 1.

Fig. 8 is a plan view of the rectangular shaped metal sheet polished on one side thereof only, used in the fabrication of this improved counter top.

Fig. 9 is a plan view of the metal facing sheet as the same would appear after the corners thereof have been cut to the desired contour and after the sink well opening has been cut from the table section thereof.

Fig. 9a is a fragmentary perspective view illustrating the manner in which the lip portions at the corners of the metal facing sheet are bent.

Fig. 10 is a plan view of the fibrous backing panel used in one method of constructing this improved counter top.

Fig. 11 is a plan view of the backing panel showing the corners thereof cut to the desired contour, the panel having backing section defining grooves cut therein which define the backing sections thereof, the table backing section having the sink well opening cut therein.

Fig. 11a is an enlarged fragmentary perspective view of one of the corners of the backing panel as the same would appear when viewed along line 11a—11a of Fig. 11.

Fig. 11b is a fragmentary cross sectional view illustrating more particularly the neck portion which connects the apron and splash backing sections to the table backing section as the same would appear when viewed along line 11b—11b of Fig. 11.

Fig. 12 is a plan view showing the backing panel illustrated in Fig. 11 adhesively bonded to the metal facing sheet shown in Fig. 9, with the parts thereof in proper register.

Fig. 13 is an enlarged fragmentary cross-sectional view of the metal clad panel shown in Fig. 12 as the same would appear when viewed along line 13—13 of Fig. 12.

Fig. 14 is an enlarged fragmentary transverse cross-sectional view of the metal clad panel as the same would appear when viewed along line 14—14 of Fig. 12.

Fig. 15 is a plan view of the metal clad panel shown in Fig. 12 after the V-shaped grooves have been cut in the backing panel and after the metal lip portions have been bent to their final position, providing a metal clad panel ready for shaping operations.

Fig. 16 is a plan view of a fibrous backing panel of modified form, this backing panel comprising separate backing sections connected in proper spaced relationship by corrugated fasteners.

Fig. 17 is a plan view of the modified backing panel as shown in Fig. 16 after the same has been adhesively bonded to a metal facing sheet of the form shown in Fig. 9.

Fig. 17a is an enlarged fragmentary perspective view showing a fragmentary portion of the table backing section and an adjacent apron backing section with a corrugated fastener in position to be driven into these sections to connect the same to provide a unitary panel.

Fig. 18 is a plan view of the metal clad panel at a further stage of assembly, this view particularly showing the rim formations formed in the metal facing sheet.

Fig. 19 is an enlarged fragmentary cross-sectional view of the metal clad panel as the same would appear when viewed along line 19—19 of Fig. 18 and having a backing panel in the form shown in Fig. 15, this view also showing diagrammatically a cross section of the dies employed to form the side rim formations in the metal sheet.

Fig. 20 is an enlarged transverse cross-sectional view of the metal clad panel as the same would apear when viewed along line 20—20 of Fig. 18 and having a backing panel in the form shown in Fig. 15, this view also showing the dies employed in forming and shaping the front rim formation in the metal facing sheet.

Fig. 21 is an enlarged longitudinal cross-sectional view of the splash section of the metal clad panel as the same would appear when viewed along line 21—21 of Fig. 18 and having a backing panel in the form shown in Fig. 15.

Fig. 22 is an enlarged longitudinal cross-sectional view of the metal clad panel formed as shown in Fig. 18, this panel having been formed by the employment of a fibrous backing panel in the form shown in Figs. 16 and 17.

Fig. 23 is an enlarged transverse cross-sectional view of the metal clad panel formed as shown in Fig. 18, this metal clad panel employing a backing panel in the form shown in Figs. 16 and 17.

Fig. 24 is a perspective view of the metal clad panel shown in Fig. 18 as the same would appear after the front and side apron sections of the main table portion, and the shelf and end sections of the splash portion have been shaped into formed position.

Fig. 25 is a longitudinal cross-sectional view through the table portion of the partially formed counter top as the same would appear when viewed along line 25—25 of Fig. 24.

Fig. 26 is a transverse cross-sectional view of the partially assembled counter top as the same would appear when viewed along line 26—26 of Fig. 24.

Fig. 27 is a longitudinal cross-sectional view of the partially formed splash section as the same would appear when viewed along line 27—27 of Fig. 24.

Fig. 28 is a rear face view of the partially formed counter top after the addition of the stiffening strips, this view additionally showing certain elemental details of the clamping frame employed in shaping and retaining the apron sections surrounding the table section, and the shelf and end sections of the splash section, in formed position.

Fig. 29 is an enlarged longitudinal cross-sectional view showing further details of the clamping frame, this view also showing the side reinforcing strips as inserted under the inturned side flange sections of the table portion, as the same would appear when viewed along line 29—29 of Fig. 28.

Fig. 30 is an enlarged transverse cross-sectional view showing further details of the clamping frame with the stiffening strips inserted under the front flange section and the rear splash flange section, as the same would appear when viewed along line 30—30 of Fig. 28.

Fig. 31 is a longitudinal cross-sectional view of the partially formed splash portion showing further details of the clamping frame and the side stiffening strips inserted under the inturned flange sections of the splash portion as the same would appear when viewed along line 31—31 of Fig. 28.

Fig. 32 is a perspective view of the counter top illustrating particularly the manner in which the splash portion is shaped to extend substantially at right angles to the table portion thereof.

Fig. 33 is a transverse cross-sectional view through the formed splash portion and table portion as the same would appear when viewed along line 33—33 of Fig. 32, this view additionally showing a cross section of the splash forming tool, and a cross section of the rear stiffening bar in position to be applied to the rear face of the rounded metal corner at the base of the main splash section.

Fig. 34 is a fragmentary perspective view showing one end of the counter top and the corner shoe prior to application to the counter top.

Fig. 35 is an enlarged fragmentary cross sectional view through the front apron section as the same would be formed from the metal clad panel illustrated in Fig. 17; and Fig. 36 is an enlarged fragmentary cross-sectional view of the side apron section as the same would appear when formed from the metal clad panel shown in Fig. 17.

Similar reference characters refer to similar parts throughout the several views of the drawings and specification.

The improved counter top construction, as generally illustrated in Figs. 1 to 7 inclusive, comprises a metal clad table section $a$ which may have one or more sink wells $b$ positioned and arranged therein as may be desired. If equipped with a sink well, the metal clad table section $a$ would present side drain portions $a'$ at each side of the sink well $b$, a front ledge portion $a''$ extending at the front of the sink well $b$, and a rear ledge portion $a'''$ extending along the rear edge of the sink well $b$.

The table section $a$ merges smoothly into a rear splash section $c$ which may rise any desired distance to protect the building wall adjacent to which the counter top is mounted. The front edge of the table section $a$ merges into a downwardly extending apron section $d$, and the side edges of the table section $a$ merge into downwardly extending apron sections $e$. The vertical splash section $c$ merges into a horizontally extending shelf section $f$ and into vertical end sections $g$. The front edge and the side edges of the table section are surrounded by a raised rim $h$ approximately $\frac{3}{16}$ to $\frac{1}{4}$ of an inch in height and adequate to prevent liquids deposited upon the table section from overflowing to the floor. The front and side apron sections $d$ and $e$ are provided with inturned flange sections $k$ and $r$ respectively, and the shelf section $f$ and the end sections $g$ of the splash portion are also provided with inturned flange sections $s$ and $t$ respectively. Shoe sections $i$ may be secured to the rear corners of the counter top to further stiffen and strengthen the construction and give the same a finished appearance. The rear ledge portion $a''$ of the table section $a$ may be provided with suitable openings $j$ for the convenient attachment of faucets and like plumbing fixtures.

Improved counter tops made in accordance with this invention are designed to be mounted upon floor cabinets, restaurant and bar counters, tables and like supporting structures S, as typically illustrated in Fig. 1, to provide a combined table top and splash panel therefor. The table section may also be provided with one or more sink wells if so desired. This improved counter top is adapted to be fixed and secured to the supporting structure by concealed fasteners, providing a construction which is strong and durable, light in weight, pleasing in appearance and highly sanitary, with all exposed surfaces thereof covered by a metal facing which is smooth and free from crevices or visible lines of juncture.

Counter tops of the type generally above described may be economically fabricated and constructed from a metal facing sheet $m$ of relatively light gauge metal, preferably a bright metal, which need not have a greater thickness than 18 to 30 gauge. The metal facing sheet is backed up, reinforced and stiffened by a fibrous backing panel $p$ which may comprise laminated plywood, or other hard and durable sheathing, used in the building industry. The metal facing sheet $m$ may be purchased unfinished and unpolished, cut to rectangular shape of sufficient dimensions to form the desired counter top. The metal facing sheet is sanded or polished to the desired finish on one side thereof only as shown in Fig. 8, preferably before any cutting or fabrication operations are performed thereon.

As an initial step in the fabrication, the metal sheet $m$ shown in Fig. 8 is placed in a press and the corner portions $m'$ removed, leaving shaped corner edges as shown in Fig. 9. Short slits 24 are cut diagonally into each of the front corners of the metal sheet and diagonally extending slits 34' are cut into the rear corners of the metal sheet. A pair of longitudinally extending slits 25 are cut in the metal sheet to extend inwardly a predetermined distance from each side edge thereof. A sink well opening 8 of desired size is cut out from the center section of the metal sheet in event the sink well is to be provided in the counter top as finally constructed.

As thus formed, the metal facing sheet as shown in Fig. 9 presents a table section 1, a front apron section 15 defined by the longitudinally bending line 4, and side apron sections 20 defined by the generally parallel extending bending line 5. The front apron section 15 is provided with a flange section 16 defined by a bending line 17 and the side apron sections 20 are each provided with a flange section 21 defined by a bending line 22. A main splash section 2 extends along the rear edge of the table section 1, defined by a bending band 3. A shelf section 32 defined by bending line 33 extends from the longitudinal edge of the main splash section 2, and an end section 26 extends from each end of the main splash section 2, each defined by bending line 27. Each end section 26 is provided with a side flange section 28 defined by bending line 29, and the longitudinal edge of the shelf section 32 is provided with a flange section 35 defined by bending line 36.

A lip portion 18 extends from each end of the front apron section 15 and is defined by a bending line 5' substantially in alignment with adjacent bending line 5. The front end of each of the side apron sections 20 is likewise provided with a lip portion 23 defined by a bending line 4' substantially in alignment with the bending line 4. Each end of the shelf section 32 of the splash portion of the metal sheet is provided with a lip portion 34 defined by a bending line 27' substantially in alignment with the adjacent bending line 27. The upper end of each end section 26 is also provided with a lip portion 30 defined by a bending line 33' substantially in alignment with the bending line 33. The adjacent lip portions 30 and 34 are separated by the diagonally extending cut line 34' previously described which extends to the adjacent corner of the main splash section 2. The adjacent lip portions 18 and 23 are separated by the diagonally extending cut line 24 which extends to the adjacent corner of the table section 1. Each of the longitudinal slits 25 likewise extend to the adjacent corner of the table section 1.

It will be appreciated that when the metal facing sheet has been cut and formed as shown in Fig. 9 it is substantially in flat condition, and that the bending lines 4 and 17, 5 and 22, 3, 33 and 36 are shown in Fig. 9 merely to indicate the lines along which the metal facing sheet will be bent in later forming operations. The lip portions 18 and 23 may be bent along the bending lines 5' and 4' to extend upwardly from the rear face of the metal sheet, as shown more particularly in Fig. 9a, either before or after the fibrous backing panel is adhesively bonded to the metal facing sheet. Similarly, the lip portions 30 and 34 may be bent along the bending lines 33' and 27' to extend upwardly from the rear face of the metal sheet. Where a sink well opening 8 is to be provided, a surrounding edge portion of the table section 1 of the metal sheet may be pressed to define a gently sloping flange portion 9 terminating in a down turned lip portion 10, which forming operation may be executed either before or after the backing panel is bonded to the metal sheet. Where a sink well opening 8 is provided in the table section 1 of the metal sheet, the sink well opening may be so located that the table section defines suitable side drain areas $a'$, a front drain or ledge area $a''$ and a rear ledge area $a'''$ as shown in Fig. 1.

The fibrous backing panel $p$ may be formed of laminated plywood, hard pressed fiber board, pressed composition board, or like strong fibrous sheathing commonly used in the building industry. The fibrous backing panel $p$ is preferably approximately ¼ inch in thickness, although it may vary in thickness from as low as ⅛ of an inch to ½ inch or more in thickness.

In accordance with one manufacturing procedure of this invention, a substantially rectangular backing panel is provided as shown in Fig. 10. Corner portions $p'$ of the panel are removed on a corner notching machine, and open grooves 43, 45 and 61 are cut in the panel to define the boundaries of the table backing section 41. If the counter top is to be provided with a sink well, a sink well opening 41' is cut from the table backing section 41, as shown in Fig. 11, to register with the sink well opening 8 cut in the table section 1 of the metal sheet. It will be noted that the grooves 43, 45 and 61 are so cut as to present spaced necks 43' which serve to retain the backing sections defined by these grooves together as a one-peice panel unit. It will be noted by referring to Fig. 11b, that each of the connecting necks 43' are undercut as at 43'' along the metal attaching face of the backing panel. The grooves 43, 45 and 61 pierce the panel so as to present open grooves or slots therein of predetermined width. The outer longitudinal edge 46 of the groove 43 is cut at an incline of approximately 45° with respect to the metal attaching face of the backing panel. The side groove 45 has a longitudinal edge 47 thereof cut on an incline of approximately 45° with respect to the metal attaching face of the backing panel. The groove 61 presents substantially square cut longitudinal edges extending at an angle of approximately 90° to the metal attaching face of the backing panel.

The backing panel thus presents a front apron backing section 42 and an adjacent flange backing section 48 defined by the marker line 49, as shown in Fig. 11. Each end face 50 of the front apron backing section 42 is cut on an incline so as to present an end face extending at an angle of approximately 45° to the metal attaching face of the apron backing section. Each end 51 of the front flange backing section 48 is cut on a bias extending at an angle of approximately 45° to the groove marker line 49. Each of the open grooves 45 define a side apron backing section 44 to which may be attached a flange backing section 52 defined by the groove marker line 53. The front end of each side apron backing section 44 is cut to present an inclined end face 54 substantially in line with the adjacent slot groove 43. The front end of each flange backing section 52 presents a square end face 55 which extends at an angle of approximately 45° with respect to the adjacent groove marker line 53. The groove marker lines 49 and 53 define the location of V grooves which will be cut in the backing panel either prior to attachment of the backing panel to the metal facing sheet, but preferably after the backing panel has been adhesively bonded to the metal facing sheet.

The splash portion of the backing panel is defined by the open slot groove 61 and presents a main splash backing section 60, a shelf backing section 62 defined by the groove marker line 63, and may also have an associated flange backing section 64 defined by the groove marker line 65. An end backing section 68 extends from each end of the main splash backing section 60 and is defined therefrom by a groove marker line 69 substantially in alignment with the adjacent open groove 45. A flange backing section 70 may be provided which is defined from the adjacent end backing section 68 by a groove marker line 71. The upper end face 72 of each end backing section 68 is cut at an angle of approximately 45° with respect to the metal attaching face of the backing panel. The upper end of each of the associated flange backing sections 70 presents a square cut end face 73 which extends at an angle of approximately 45° with respect to the adjacent groove marker line 71. Each end of the shelf backing section 62 is also sliced off to present an inclined end face 66 which extends at an angle of approximately 45° to the metal attaching face of the panel. Each end of the associated flange backing section 64 is cut to present a square cut end face 67 which extends at an angle of approximately 45° to the adjacent groove marker line 65.

As thus cut and formed the backing panel p as shown in Fig. 11 presents backing sections shaped to closely conform in area to the corresponding metal facing sections of the metal sheet shown in Fig. 9 to which the backing panel is to be applied. A film of bonding adhesive is interleavened between the metal facing sheet and the backing panel, and the bonding adhesive then permitted to harden and set to securely bond the metal facing sheet to the backing panel as shown in Figs. 12, 13 and 14.

The connecting necks 43' of the backing panel are then removed so that the open channel groove 61 extends completely across the entire longitudinal length of the backing panel as shown in Fig. 15, the channel groove 61 exposing the bending line 3 and the aligned slits 25 of the metal facing sheet. The connecting necks 43' are removed from the channel grooves 43 and 45 so that the ends of the front channel groove 43 will intersect the adjacent ends of the side channel grooves 45, and the rear ends of the side channel grooves 45 will intersect the open channel groove 61, as shown in Fig. 15.

The grooves 43 and 61 may be initially cut on a line grooving machine having a pair of cutting wheels, one of which is shaped to cut the square cut channel groove 61, and the other wheel employed to cut the groove 43 presenting the inclined face 46. The same grooving machine may be used to remove the connecting necks 43' from these grooves after the backing panel has been applied to the facing sheet. The side grooves 45 are also initially cut on a grooving machine having two grooving wheels, designed to cut the open grooves 45 so as to present an inclined edging face 47. The same grooving machine is used to remove the connecting necks 43' after the backing panel has been bonded to the metal facing sheet.

It will be noted, by referring more particularly to Fig. 11b, that the metal attaching side of the connecting necks 43' is spaced from the metal facing sheet m so that the connecting necks are not adhesively bonded to the metal sheet; a feature which permits the connecting necks 43' to be easily removed with no backing fragments adhering to the metal facing sheet. It will be appreciated that the open side grooves 45 are each so positioned as to expose the adjacent side bending line 5 of the metal sheet, and the open groove 43 is so located as to expose the front bending line 4 of the metal sheet. More particularly, the pointed edge 47' of the inclined face 47 of each groove 45 is located so as to extend substantially in alignment with the adjacent bending line 5 of the metal sheet, and the pointed edge 46' of the inclined face 46 of the groove 43 is located to extend substantially in alignment with the bending line 4 of the metal facing sheet.

The metal clad panel may then be run through a grooving machine equipped with three grooving wheels formed to cut the V-shaped grooves 49', 63' and 65' along the parallel extending groove marker lines 49, 63 and 65 respectively. The panel is again run through a grooving machine which may have four grooving wheels adjusted to cut the V grooves 53', 71' and 69' to extend along the groove marker lines 53, 71 and 69 respectively of the backing panel. As thus formed, the valley of the V groove 49' will directly overlie the bending line 17 of the metal facing sheet, the valley of the V groove 63' will directly overlie the bending line 33 of the metal facing sheet, and the valley of the groove 65' will overlie the bending line 36 of the metal facing sheet. Similarly, the valley of each groove 53' will overlie the adjacent bending line 22 of the metal facing sheet, the valley of each groove 69' will overlie the adjacent bending line 27 of the metal facing sheet, and the valley of each groove 71' will overlie the adjacent bending line 29 of the metal facing sheet. In event the sink well is provided in the table section a, the sink well opening 41' in the backing panel is made somewhat larger than the sink well opening 8 in the metal facing sheet, so that the surrounding flange portion 9 of the metal facing sheet will not be covered by the table backing section 41.

The lip portions 18 of the metal sheet may then be bent to snugly overlie the inclined end faces 50 of the front apron backing section 42, and the lip portions 23 of the metal facing sheet may be swaged over the adjacent inclined end faces 54 of the side apron backing sections 44, as illustrated in Fig. 15. Similarly, the lip portions 34 of the metal sheet are swaged over the adjacent inclined end faces 66 of the shelf backing section 62, and the metal lip portions 30 are swaged over the adjacent inclined end faces 72 of the end backing sections 68 of the splash portion.

The adjacent ends of the metal front flange section 16 and the side flange sections 21 may also be provided with lid portions if desired which are bent to snugly overlie the adjacent end faces 51 and 55 respectively of the flange backing sections 48 and 52. If desired, however, the flange backing sections 48 and 52 may be dispensed with. The adjacent ends of the metal top flange section 35 and the side flange sections 28 may also be provided with lip portions to be bent over the square cut ends 67 and 73 of the flange backing sections 64 and 70 respectively. As a further modification, the flange backing sections 64 and 70 may be eliminated, leaving the metal flange sections 35 and 28 uncovered by the backing panel. The metal clad panel formed as illustrated in Fig. 15, or modified in the respects above indicated, is ready for shaping operations.

As a practical alternative, the backing panel $p$ may be assembled from a plurality of separate backing sections by following the method illustrated in Fig. 16. A table backing section 41 is provided which is generally rectangular in form and presenting square cut edges of a size to accurately cover the table section 1 of the metal sheet within the raised rim formations $h$ thereof. A separately formed front apron backing section 42 is cut to a size to accurately cover the rear face of the front apron section 15 of the metal facing sheet. Each end 50 of the front apron backing section 42 is sliced on an incline so as to present an end face which slopes at an angle of approximately 45° to the metal attaching face of the apron backing section. The longitudinal edge 46 and the front apron backing section 42, which is to be positioned next adjacent the table backing section 41, is also cut to provide a slanting face edge 46 which extends at an angle of approximately 45° to the metal attaching face of the apron backing section.

Separately formed side apron backing sections 44 are provided of a size and shape to accurately cover the inside face of the side apron sections 20 of the metal facing sheet. Each of the side apron backing sections 44 have the front end thereof cut on a slope so as to present an end facing edge 54 inclined at an angle of about 45° with respect to the metal attaching face of the apron backing section. Each side apron backing section 44 has one longitudinal edge thereof cut in an incline so as to present an edge face 47 which may be slightly rounded and inclined at an angle of approximately 45° to the metal attaching face of the apron section.

A separately formed backing section for the apron portion of the construction is also provided which presents a main backing section 60 and a shelf backing section 62 defined by the longitudinally extending V groove 63'. A pair of end backing sections 68 are provided, each of which is defined from the adjacent end of the main splash backing section 60 by a V groove 69'. Each end of the shelf backing section 62 is designed to present an inclined end face 66 sloped at an angle of approximately 45° with respect to the metal attaching face of the section 62. The upper end of each of the end backing sections 68 is also cut to present an inclined end face 72 inclined approximately 45° with respect to the metal attaching face thereof.

It will be noted by referring to Fig. 16, that the table backing section 41, the apron backing sections 42 and 44, and the splash backing section 60 having the shelf backing section 62 and end backing sections 68 associated therewith, may be separately cut and formed with a minimum waste of material. These backing sections may be conveniently connected together when laid flat upon a work bench provided with suitable corner guide blocks 100 which permit convenient interfitting of the sections as shown in Fig. 16. The longitudinally extending inclined edge 46 of the front apron backing sections 42 is spaced from the adjacent edge of the table backing sections 41 a specified distance to provide an open groove 43 therebetween. The width of the open groove 43 may be accurately defined by removable wedge blocks 101 inserted therein. The width of the open groove 43 is such as to snugly receive the adjacent edge 46 of the apron backing section 42 when the metal clad panel is shaped into counter top form as hereinafter described. The inclined longitudinal edge 47 of each of the side apron backing sections 44 are also accurately spaced, as by the use of wedge blocks 101, from the adjacent edge of the table backing section 41 so as to provide an open groove 45 designed to snugly receive the adjacent edge 47 of the apron section when the counter top has been formed.

The longitudinal edge of the main apron backing section 60 may be spaced from the adjacent rear edge of the table backing section 41, as by the use of wedge blocks 101, so as to present therebetween an open groove 61 of predetermined width. The V grooves 63' and 69' may be cut in the splash backing portion of the backing panel either before or after the backing panel has been adhesively bonded to the metal facing sheet.

The front apron backing section 42, the side apron backing sections 44 and the splash backing section 60, accurately spaced by the defined open grooves 43, 45 and 61 respectively, are temporarily connected to the table backing section 41 by driving suitable fasteners, such as the corrugated staple fastener 102 shown more particularly in Fig. 17a, into the adjacent edge portions of the sections. The spacing assembly of these separate backing sections may be quickly performed by the use of removable wedge blocks 101 and a simple guide block arrangement as illustrated in Fig. 16 in its elemental form. The fasteners 102 firmly hold the sections together to provide a panel which can be applied and adhesively bonded as a unit to the metal facing sheet as shown more particularly in Fig. 17.

When the backing panel has been adhesively bonded to the metal facing sheet as shown more particularly in Fig. 17, the table backing section 41 will be positioned to neatly cover the table section 1 of the metal sheet as defined within the raised rim formations $h$ thereof. The front apron backing section 42 will neatly cover the front apron backing section 15 of the metal sheet, with the bending line 4 of the metal sheet in alignment with the edge 46' of the inclined face 46 of the apron backing section 42. Each side apron backing section 44 will be shaped to snugly cover the side apron sections 20 of the metal sheet, with the bending line 5 of the metal sheet in alignment with the adjacent edge 47' of the inclined face 47 of the apron backing section 44. The main splash backing section 60 will cover the main splash section 2 of the metal sheet, leaving the bending line 3 of the metal sheet exposed along the open groove 61. The end backing sections 68 will cover the adjacent end sections 26 of the metal sheet with the valley of the V grooves 69' aligned with the bending lines 27 of the metal sheet. The shelf backing section 62 will cover the shelf section 32 of the metal sheet, with the valley of the V groove 63' overlying the bending line 33 of the metal sheet.

The lip portions 18 and 23 of the metal sheet may then be bent to snugly overlie the adjacent inclined end faces 50 and 54 of the backing panel, and the lip portions 30 and 34 of the metal sheet may be bent to overlie the inclined end faces 66 and 72 of the backing panel. The staple fasteners 102, shown in Fig. 17, are removed from the backing panel prior to shaping formation of the metal clad panel. It will be noted that the metal flange sections 16, 21, 35 and 25 of the metal facing sheet are not covered by corresponding flange backing sections in the metal clad panel as illustrated in Fig. 17. It will be appreciated however that corresponding flange backing sections may be provided as in the manner illustrated in the metal clad panel shown in Fig. 15. In event a sink well is to be associated with the metal clad panel shown in Fig. 17, a suitable sink well opening can be cut in the table section 1 of the metal sheet and the table backing section 41 of the backing panel in a manner so that the inclined flange portion 9, surrounding the sink well opening 8 cut in the metal sheet, would be exposed and not covered by the table backing section 41.

The metal clad panel constructed and formed as shown in Fig. 15 or Fig. 17, is then placed in a die press which operates to deform the peripheral portions 12 and 13 of the table section 1 of the metal facing sheet in the manner shown in Figs. 18 to 23 inclusive. The rim forming operation may be performed in one or more stages as desired by the use of one or more die presses, illustrated in elemental form in Figs. 19 and 20. The die press is provided with a press table 105 having a flat table surface 106 upon which the table backing section 41 is supported, and raised table surfaces 107 upon which the side apron backing sections 44 are supported. The press is equipped with vertically reciprocating press blocks 108, each having a die face 109 designed to press against the metal sheet directly over the open grooves 45 so as to bend and shape the peripheral side edge portions 13 of the metal table section 1 to the desired rim conformity.

In the same or in a second die press operation, the table backing section 41 is supported upon the table surface 106 of the press table and the apron backing section 42 is supported upon the raised surface 110 of the press table as shown in Fig. 20. A die block 111 having a die face 112 operates to shape the front edge portion of the metal table section 1 to provide the inclined rim face 12. A die block 113 having a flat die face 114 may be provided to exert pressure against the table section 1 and the splash section 2 of the metal sheet to hold the metal clad panel in proper position. The die blocks 108 and 111 may be so formed as to merge the adjacent ends of the rimmed faces 12 and 13 into a smooth and unbroken corner bead 14. If necessary, corner die blocks may be employed to insure the desired rounded and continuous contour at the corners of the rim formation h. It will be noted that the splash portion of the metal clad panel will lie in the same flat plane as the table portion a after the raised rim faces 12 and 13 have been formed in the metal facing sheet, as will be evident by referring to Figs. 18 to 23 inclusive.

When the rim facing portions 12 and 13 have been formed in the peripheral boundary of the table section 1 of the metal facing sheet as illustrated in Figs. 18 to 23 inclusive, the metal clad panel is in condition for further shaping into counter top form as shown in Figs. 24 to 27 inclusive. Immediately before the shaping operation, a strip of bonding adhesive may be placed within the open grooves 43, 45 and 61 and within the V grooves 49', 53', 63', 65', 69' and 71'. Thereupon the front apron section d, the side apron sections e, the end sections g and the shelf section f are shaped to extend substantially at right angles to the table section a and the main splash section c. The flange sections k, r, s and t are also bent inwardly so as to extend substantially parallel to the main table section a and the splash section c. This operation can be performed by hand or by a simple shaping jig or fixture.

As thus formed the open groove 43 will receive the adjacent edge portion 46 of the front apron backing section 42 with the inclined edge 46 snugly seating against the under surface of the raised metal rim 12 as shown in Fig. 26. The open grooves 45 will likewise receive the adjacent edge portions 47 of the side apron backing sections 44, with each inclined edge 47 firmly abutting against the rear face of the adjacent raised metal rim formation 13 as shown in Fig. 25. The V groove 63' between the splash backing section 60 and the shelf backing section 62 will close to form a mitered joint 63" as shown in Fig. 26. Each V groove 69' will likewise close to form a mitered joint 69" between the end backing sections 68 and the adjacent ends of the splash backing section 60 as shown in Fig. 27.

In event the inturned flange sections of the metal sheet are supported by flange backing sections as shown in Figs. 15, 25, 26 and 27, the inturning of the metal flange sections 21 will close the V grooves 53' to form a mitered joint 53" between each flange backing section 52 and the adjacent side apron backing section 44 as shown in Fig. 25; the V groove 49' will close to form a mitered joint 49" between the front flange backing sections 48 and the adjacent front apron backing section 42; the V groove 65' will close to form a mitered joint 65" between the flange backing section 64 and the shelf backing section 62 as shown in Fig. 26; and the V grooves 71' will each close to form a mitered joint 71" between the flange backing section 70 and the adjacent end backing section 68 as shown in Fig. 27. As thus formed, the metal clad panel will appear as diagrammatically illustrated in Fig. 24.

The bending formations above described may be facilitated by the use of a clamping frame as more particularly illustrative in Figs. 28 to 31 inclusive, which frame additionally serves to retain the formations in position until the bonding adhesive has fully set. The metal table facing section 1 of the metal clad panel is positioned to be supported upon a work table 117 having grooves 118 and 119 therein positioned and shaped to receive the rim formation h of the metal clad panel. The erected shelf section f is positioned to abut against a fixed clamping member 120 and an adjustable clamping member 121 is adjusted to abut against the erected front apron section d. The clamping member 121 is manipulated by adjusting bolts 123 having adjusting heads 124, the bolts 123 being threaded through a fixed bar 122 so that the bolts 123 may be manipulated to press the erected shelf section $f$ and the front apron section $d$ of the metal clad panel between the clamping members 120 and 121. Suitable shaped wedges 115 are positioned in the open groove 61 during this clamping operation so as to retain the table backing section $a$ and the splash section $c$ coplaner and prevent buckling thereof.

The clamping frame is also provided with a fixed clamping member 125 designed to abut against one of the side apron sections $e$, and an adjustable clamping member 126 designed to abut against the other side apron section $e$. The side apron sections $e$ are firmly clamped between the clamping members 125 and 126 by the provision of adjusting bolts 127 threaded through a fixed bar 129, the bolts 127 having adjusting heads 128 whereby the adjustable clamping member 126 may be manipulated. It will be noted by referring to Figs. 28 to 31 inclusive, that the end sections $g$ of the splash portion are likewise clamped between the clamping members 125 and 126. By means of a clamping frame as above generally described, the apron sections $d$ and $e$, the shelf section $f$, and the end sections $g$ may be held firmly in their proper erected position.

Reinforcing and stiffening strips are then inserted under the inturned flange sections of the construction as also illustrated in Figs. 28 to 31 inclusive. A front stiffening strip 75, which may first be coated with a bonding adhesive, is inserted under the inturned front flange section $k$. A reciprocable pressure block 131 may be used to exert pressure against the inturned metal flange section 16 to retain the flange section in position, while screws or nails 77 are driven through the flange section 16 and into the underlying stiffening strip 75. A rear stiffening strip 78 is inserted under the inturned flange section $s$ of the apron portion, the flange section $s$ being held in position by a reciprocable pressure block 132 while securing screws or nails 77 are applied as shown in Fig. 30. Similarly, a side stiffening strip 76 is inserted under each inturned flange section $r$, the inturned flange sections $r$ being then secured to the adjacent stiffening strips 76 as by screws or nails 77 while pressure is applied to the flange sections by the reciprocable pressure blocks 130 as shown in Fig. 29. Stiffening strips 79 are also inserted under the inturned flange sections $t$ of the apron portion, the flange sections $t$ being secured to the adjacent stiffening strips 79 as by screws or nails 77 while pressure is applied to these flange sections by the reciprocable pressure blocks 130.

As thus constructed, the stiffening strips 75, 76, 78 and 79 retain the inturned flange sections, and their associated apron sections $d$ and $e$ and their associated end sections $g$ and shelf section $f$, in firm fixed position until the bonding adhesive has taken a firm hold and after the partially formed counter top has been removed from the clamping frame. If no adhesive is used to secure the stiffening strips firmly in position, a sufficient number of screws or nails 77 may be applied to effect this result. It will be noted that the pressure blocks 130 also serve to drive the inclined edges 47 of the side apron backing sections 44 firmly against the adjacent inclined faces 13 of the metal facing sheet, and the pressure block 131 also serves to drive the inclined edge 46 of the front apron backing section 42 firmly against the rear face of the rim formation 12 of the metal facing sheet as shown in Fig. 30. Pressure blocks 130, 131 and 132 also serve to insure close fitting mitered joints 49″, 53″, 63″, 65″, 69″ and 71″ as shown in Figs. 29, 30 and 31.

In the next operation the splash panel portion $c$ is erected to extend substantially at right angles to the table portion $a$ as shown more particularly in Figs. 32 and 33. The rounded edge 136 of an elongated mandrel 135 is positioned along the bending line 3 of the metal sheet which serves to effect a rounded curvature 3′ to the metal facing sheet at the base of the splash portion $c$ as the same is swung into erect position. When this operation is performed, the open groove 61 of the backing panel will further gap open as shown in Fig. 33. A stiffening bar 80, which may be made of wood or like fibrous material, is interfitted against the rear face of the metal curved portion 3′, the stiffening bar 80 having a conforming curvature 81 as shown in Figs. 33 and 34. The stiffening bar 80 is so shaped and formed that the adjacent ends of the side stiffening strips 79 will firmly abut against the face 81′ of the stiffening bar 80, and the adjacent ends of the side stiffening strip 76 will snugly abut against the face 81″ of the stiffening bar 80. The adjacent ends of the stiffening bar 80 and the stiffening strips 75, 76, 78 and 79 may be secured together as by adhesive or metal fasteners. As thus constructed the stiffening bar 80 forms with the stiffening strips 75 and 76 a rectangular frame which gives further strength and rigidity to the table portion of the construction. The stiffening bar 80 also forms a rectangular stiffening frame with the stiffening strips 79 and 78 to further stiffen and strengthen the formed splash portion of the construction. The counter top at this stage of assembly is strong and rigid and can be handled without danger of deformation.

In event one or more sink wells are to be incorporated as a part of the table portion $a$, the sink well $b$ may be formed from a single sheet of bright sheet metal of sufficiently heavy gauge to withstand denting. The sink well $b$ as shown in Figs. 1 to 5 inclusive comprises essentially a bottom wall portion 85 having a suitable drain opening 85′ therein, the bottom portion 85 being enclosed by a surrounding side wall portion 86 of any desired depth. The upper edge of the side wall portion 86 is preferably provided with an outwardly flared flange portion 87 which presents a recessed shoulder 88. The outwardly flared flange portion 87 is designed to seat against the sloped flange portion 9 of the metal table section 1, with the lip portion 10 shaped to snugly overlie and abut against the formed shoulder portion 88 of the sink well $b$. The flange portion 87 of the sink well can be readily and expeditiously attached to the inclined flange portion 9 of the metal facing sheet by applying a wire of soldering or welding metal to the adjacent surfaces of the flange portions 87 and 9, which metal wire is melted to bond these flange portions into integral union by the application of heat and pressure to the abutting flange portions. A leakproof joint is thus provided which may be rendered invisible by applying a seam of welding or soldering metal to the joint, the seam being smoothed off by a simple burnishing or polishing operation.

When the sink well has thus been attached in position, filler boards 90 are applied to fill the space within the stiffening frame formed by the stiffening strips 75 and 76 and the stiffening bar 80, as shown more particularly in Figs. 2, 3 and 5. The filler boards 90 may have a notched interlock 92 with the adjacent stiffening frame. Suitable filler boards 91 are also inserted within the frame at the rear face of the apron portion c, the filler boards 91 having an interlocking joint 93 with the adjacent stiffening strips 78 and 79, and may also be interlocked to the stiffening bar 80. The filler boards 90 and 91 may also be bonded in position by the use of a bonding adhesive. A suitable joint packing 89 of bituminous or like material, may be used to fill the space between the surrounding side wall portions 86 of the sink well b and the adjacent edges of the filler boards 90 and the adjacent edges of the table backing section 41, as shown more particularly in Figs. 2 and 3.

To give the improved counter top construction a fully finished appearance, a seam 97 of soldering or welding metal may be applied along the front vertical corners of the counter top construction to adhesively bond the adjacent inturned lip portions 18 and 23 of the metal facing sheet into integral union, as shown more particularly in Fig. 5. The jointing seam may be burnished or polished so as to leave an invisible joint. The mitered joint between the adjacent ends 16' and 21' of the metal flange sections 16 and 21, as shown in Figs. 4 and 5, may also be joined into integral union by a seam 97' of soldering or welding metal, which joint can be burnished to present an invisible juncture. The adjacent inturned lip portions 30 and 34 of the splash portion may be bonded together into integral union by a seam 98 of a welding or soldering metal, the seam joint being polished or burnished to render the joint substantially invisible. The adjacent ends 31 and 35' of the metal flange sections 28 and 35, as shown in Fig. 6, may be joined into integral union by a seam 98' of soldering or welding metal, which may be burnished or polished to provide an invisible joint.

In event the counter top installation is such as to leave unconcealed the exposed ends of the wood stiffening bar 80 shown in Fig. 34, the ends thereof may be covered by a shoe i shaped from bright metal and presenting a side wall portion 94 designed to fit over and cover the exposed end of the wood stiffening bar 80, the shoe having a rear flange portion 95 adapted to be secured to the rear face of the stiffening bar 80, and a lower flange portion 96 designed to be secured to the under face of the stiffening bar 80. The facing portion 94 of the shoe i may be given a decorative triangular contour as shown in Fig. 34 to simulate a bracket, or if desired, the face portion 94 of the shoe may be cut to conform to the end shape of the stiffening bar 80 and to snugly abut against the adjacent edges 25'' and 25' of the end section 26 and the adjacent apron section 20 of the metal facing sheet. The flush joint thus formed at the metal edges may be closed by a seam of welding or soldering metal suitably burnished and polished to leave an invisible joint. A deposit of soldering or welding metal may be applied to the ends of the curved metal bend portion 3' so that the rear ends of the rim faces 13 of the metal facing sheet will smoothly merge into the erected splash section 2 of the metal sheet.

Counter tops may be made in accordance with this invention to provide a table portion a of any desired width and length and to provide a splash portion c of any desired heighth and rearward depth. The apron sections d and e of the table portion may also be made of any desired heighth and the inturned metal flange sections 16, 21, 28 and 35 may be made to extend inwardly any desired distance. The raised rim h may extend along only the front edge of the table section, or along one or both side edges of the table section, or along both the front and side edges of the table section, and can be fabricated by following the procedure above described to provide a rim formation h of any desired heighth or width.

By reason of the use of fibrous backing sections which back up and support all exposed surfaces of the metal facing sheet, this improved counter top construction is free from metallic sound or ring when drummed upon. The application of fibrous backing sections to the metal sheet prior to the bending formation thereof, permits the use of a relatively light gauge metal facing sheet, which is prevented from wrinkling or warping during the manufacture and during use. By constructing the counter top in the manner above described, the exposed faces of the metal sheet may be sanded and finished rapidly and economically in its flat condition and before any forming operations are executed thereon, thus avoiding the more difficult and time-consuming finishing operations normally necessary after the counter top has been constructed. By forming the facing surfaces of the counter top from a single piece of sheet metal, crevices and cracks in which foreign matter may gather are substantially avoided. Extensive and time-consuming welding and soldering operations heretofore necessary in the manufacture of metal clad counter tops as heretofore constructed, are also avoided.

Metal clad counter tops constructed as above described are light in weight, since strength is achieved by the use of relatively light fibrous backing sections and wood or fibrous filler boards and strips. The counter top nevertheless possesses unusual strength and rigidity and will not warp or deform. Since all exposed surface areas of the metal sheet, including the splash portion and the table portion with its associated rim formation and apron sections, are backed up by fibrous backing sections, the finished metal surfaces cannot readily be dented, even though formed of a relatively light gauge metal sheet. Counter tops may be manufactured in accordance with this invention to snugly fit and seat upon any desired supporting structure S. The inturned flange sections 16, 21, 35 and 28 may be made of any desired width so that the inner ends thereof, and securing screws or nails 77, are concealed by the structure upon which the counter top is supported. Counter tops, comprising essentially a table portion and a raised splash portion, and with or without one or more sink wells associated with the table portion, may be manufactured in accordance with the teachings of this invention on the mass production basis at greatly reduced cost as compared with methods heretofore employed in the construction of such metal clad counter tops. These improved counter tops provide a construction of lasting utility, are sanitary, and highly attractive and appealing in appearance and finish.

While certain novel features of the invention have been disclosed herein, and are pointed out in the claims, it will be understood that various omissions, substitutions, and changes may be made by those skilled in the art without departing from the spirit of the invention.

What is claimed is:

1. In the construction of metal clad counter tops having a table part and a splash part, the steps which include, providing a fibrous backing panel, notching out the corners of the backing panel, cutting spaced open grooves in said backing panel separated by uncut neck portions to define the table backing section, apron backing sections and splash backing section thereof, bonding said backing panel to a metal facing sheet so that the table backing section, apron backing sections and splash backing section will register with the corresponding table facing section, apron facing sections and splash facing section of the metal sheet, removing the neck portions from the backing panel to provide continuous open grooves between the adjacent longitudinal edges of said backing sections, offsetting those portions of the metal sheet extending between the adjacent edges of said table backing section and apron backing sections in a manner to give the desired upraised rim formation to the otherwise flat metal facing sheet, and shaping said metal clad apron sections and splash section in position to extend substantially at right angles to the metal clad table section.

2. The method of constructing metal clad counter tops presenting a table top section, a raised rim formation and a plurality of apron sections suspended from said raised rim formation, the steps which include, finishing the facing surface of the metal facing sheet while in substantially flat form, applying a removable protective coating to said finished surface to protect the same from defacement during subsequent manufacturing and handling operations, bonding a fibrous table top backing section to the unfinished face of the table forming section and a fibrous apron backing section to each of the apron forming sections of the metal sheet in a manner to provide open grooves between the spaced adjacent elongated edges of said table top backing section and the apron backing sections, offsetting that portion of the metal sheet extending between the adjacent spaced edges of said table top backing section and apron backing sections in a manner to give the desired upraised rim formation to the otherwise flat metal facing sheet, and shaping the metal clad panel thus formed by bending the apron sections thereof to extend substantially at a right angle to the table top section and substantially simultaneously exerting pressure against said apron sections edgewise thereof to effect substantial abutting contact between the adjacent unfinished face of the rim portion of said metal sheet and the adjacent edges of said apron backing sections.

3. The method of constructing metal clad counter tops presenting a table section, a raised rim formation and an apron section depending from said raised rim formation, the steps which include, providing a fibrous backing panel presenting a table backing section and an apron backing section whose adjacent elongated edges are spaced apart by an open groove of predetermined rim forming width, said adjacent elongated edges of the backing sections being connected together by removable securing elements to provide a unitary backing panel, bonding said backing panel unit to the metal facing sheet so that the table backing section and the apron backing section of the panel will register with the corresponding table forming section and the apron forming section of the metal sheet, removing said securing elements from the backing panel to provide a continuous open groove between the adjacent longitudinal edges of said backing sections, offsetting that portion of the metal sheet extending between the adjacent edges of said backing sections in a manner to give the desired upraised rim formation to the otherwise flat metal facing sheet, and shaping the metal clad panel thus formed by bending the apron section thereof to extend substantially at a right angle to the table section and substantially simultaneously exerting pressure against said apron section to effect substantial abutting contact between the adjacent face of the rim portion of said metal sheet and the adjacent edge of said apron backing section.

4. In the construction of metal clad counter tops, the steps which include, providing a fibrous backing panel, notching out the corners of the backing panel, cutting spaced open grooves in said backing panel separated by uncut neck portions to define the table backing section and apron backing sections thereof, bonding said backing panel to a metal facing sheet so that the table backing section and apron backing sections will register with the corresponding table facing section and apron facing sections of the metal sheet, removing the neck portions from the backing panel to provide continuous open grooves between the adjacent longitudinal edges of said backing sections, offsetting those portions of the metal sheet etxending between the adjacent edges of said backing sections in a manner to give the desired upraised rim formation to the otherwise flat metal facing sheet, and shaping said metal clad apron sections in position to extend substantially at right angles to the metal clad table section.

GLENN H. NORQUIST.

REFERENCES CITED

The following references are of record in the file of this patent:

UNITED STATES PATENTS

| Number | Name | Date |
|---|---|---|
| 1,440,615 | Meyercord | Jan. 2, 1923 |
| 1,630,858 | Meyercord | May 31, 1927 |
| 1,711,471 | Curran | Apr. 30, 1929 |
| 1,752,073 | Foster | Mar. 25, 1930 |
| 1,846,881 | Lewis | Feb. 23, 1932 |
| 1,916,910 | Stanitz | July 4, 1933 |
| 2,002,228 | Meyercord et al. | May 21, 1935 |
| 2,101,996 | Gerstenberg | Dec. 14, 1937 |
| 2,120,461 | Copeman | June 14, 1938 |
| 2,149,882 | Clements | Mar. 7, 1939 |
| 2,193,018 | Batcheller | Mar. 12, 1940 |
| 2,198,696 | Drain | Apr. 30, 1940 |
| 2,256,272 | Batcheller | Sept. 16, 1941 |
| 2,274,765 | Zalkind | Mar. 3, 1942 |
| 2,293,184 | Weissert | Aug. 18, 1942 |
| 2,456,065 | Just | Dec. 14, 1948 |
| 2,463,780 | Korrol | Mar. 8, 1949 |
| 2,485,648 | Norquist | Oct. 25, 1949 |
| 2,542,860 | Clements | Feb. 29, 1951 |